Oct. 20, 1959 G. R. CHAMBERS 2,909,764
ANGULAR POSITION TRANSDUCER
Filed Aug. 25, 1955 3 Sheets-Sheet 1
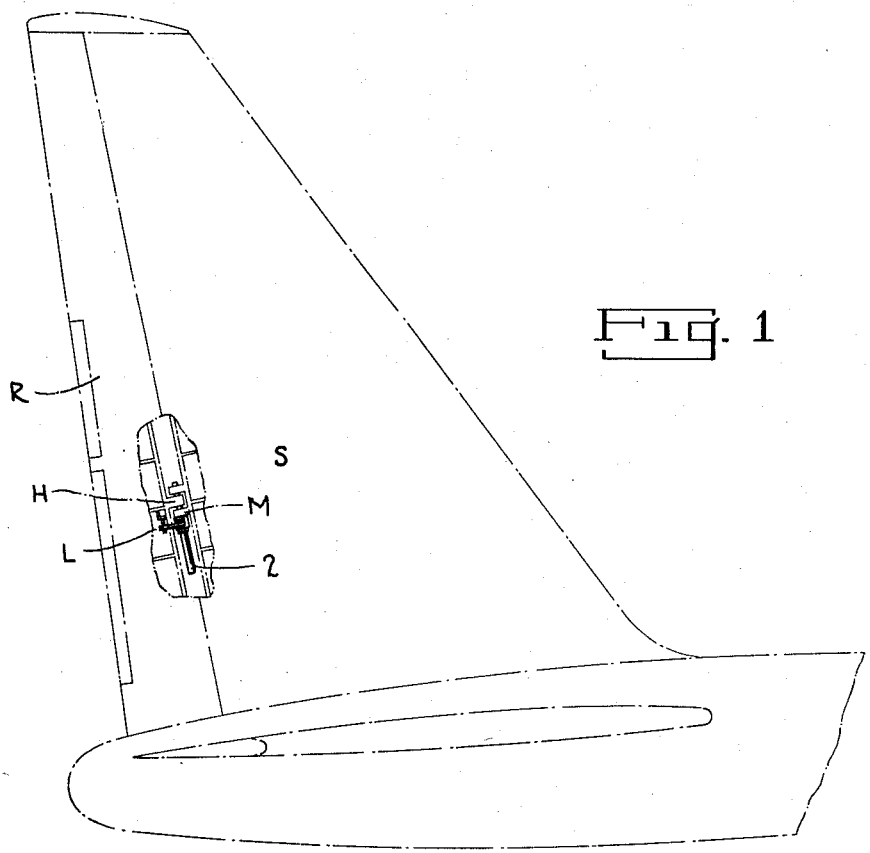
Fig. 1
Fig. 2
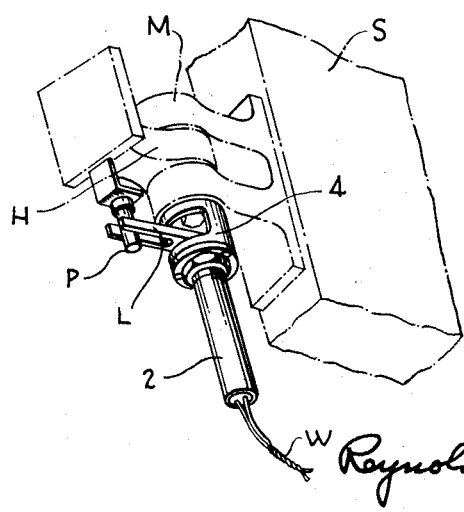
INVENTOR.
GUY R. CHAMBERS
BY Reynolds, Beach & Christensen
ATTORNEYS Oct. 20, 1959   G. R. CHAMBERS   2,909,764
ANGULAR POSITION TRANSDUCER
Filed Aug. 25, 1955   3 Sheets-Sheet 2
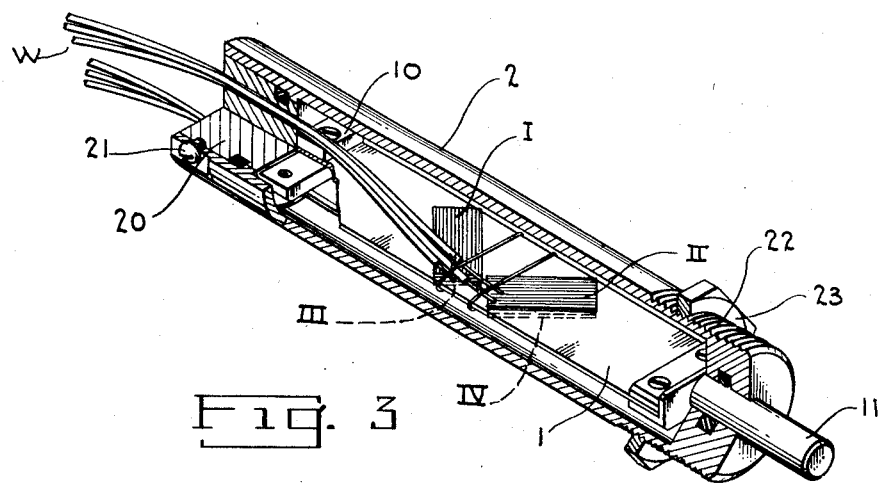
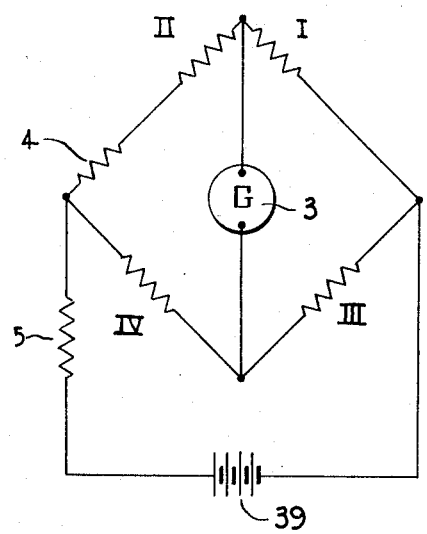
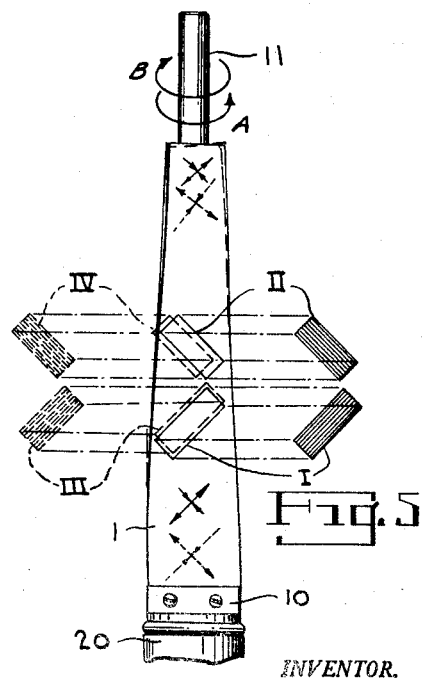
INVENTOR.
GUY R. CHAMBERS
BY
Reynolds, Beach & Christensen
ATTORNEYS

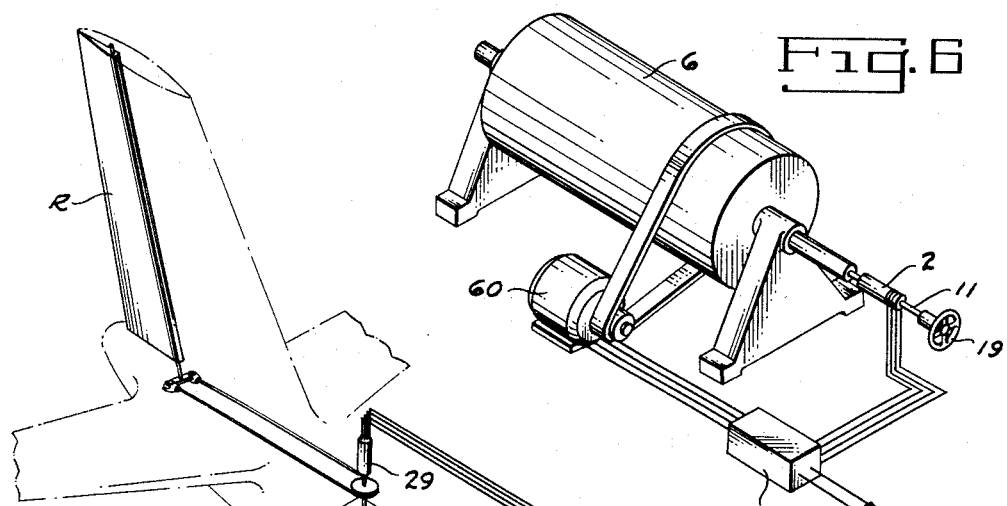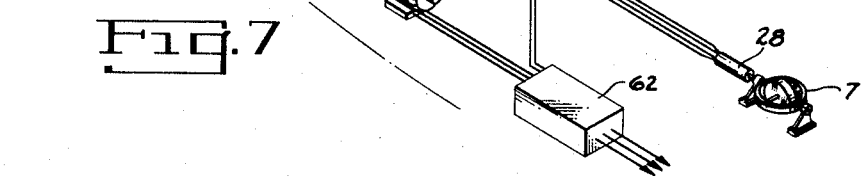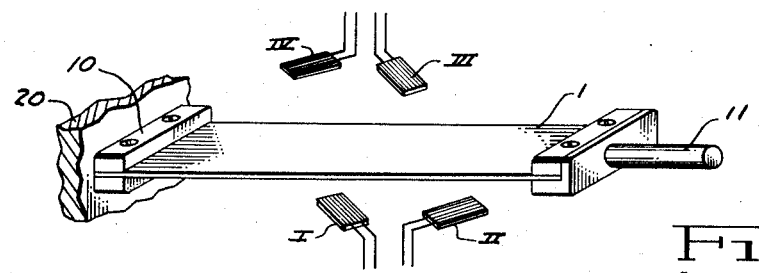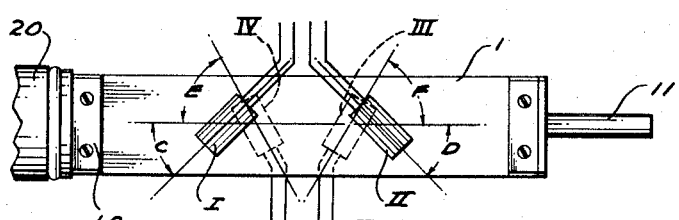

United States Patent Office 2,909,764
Patented Oct. 20, 1959

2,909,764

ANGULAR POSITION TRANSDUCER

Guy R. Chambers, Seattle, Wash., assignor to Boeing Airplane Company, Seattle, Wash., a corporation of Delaware Application August 25, 1955, Serial No. 530,542

17 Claims. (Cl. 340—177)

It is necessary in various operations to sense the extent of angular deflection of a hinged element about an axis with a high degree of resolution. The deflection may be of a high or a low angular amount. Such a determination may be required in airplane flight testing, for example, in order to calibrate or to check upon the accuracy of installed instruments which indicate such deflection or are dependent thereon for some function, as for instance, an airplane's or a ship's automatic pilot is dependent thereon for corrective action. Such a determination may be necessary as a check upon the correct functioning of an airplane's control surfaces, so as to keep informed either a crew member or, by radio, a ground observer, as to the instantaneous deflection of the control surface at any time, to give warning, for example, of overcontrol or of the presence of stall conditions, or of flutter. For such purposes it is often desirable that the sensing instrument be such as can be readily installed in advance of a test, and after the test is completed, be as readily removed.

Such a sensing instrument can be used advantageously to replace potentiometers or synchros such as are presently used in servo systems. Potentiometers, although commonly used, have the disadvantage, among others, that the sliding wiper contact often becomes dirty and breaks the circuit; this can be manifested in the servo system as a very large error signal, which can cause a violent motion of elements of the system with its attendant strains upon the entire system. If a large, massive element is being controlled, such as a ship's rudder, or large aircraft control surfaces, or a gun turret having large inertia, such a possibility is especially to be avoided, and can be by the use of the angular position transducer of this invention in lieu of the potentiometer.

Another undesirable characteristic of potentiometers is that high resolution is obtainable only by making the instrument large in circumference and/or by winding its resistance element with fine wire, such as has but a short life due to wiper action upon it. The angular position transducer of the present invention has extremely high resolution, and there is virtually nothing to wear out, yet it can be made very small and light. It is therefore especially useful in airplane installations, and will be described herein in that service primarily.

It sometimes happens in flight testing of high speed aircraft that, by reason of the powered actuators for operation of the control surfaces, the pilot loses the "feel" of the controls, and a control surface at some critical speed or altitude will commence to flutter, or will overcontrol, without the pilot becoming aware of the fact. The beginning of such a condition can be indicated by the present instrument and, indeed, if the instrument is connected through a radio transmitter to a ground instrument, it may be that the ground watcher and recorder can call the incipient flutter to the attention of the pilot in time to prevent damage, or the pilot through the indication given aboard the plane by an instrument such as that indicated in the drawing at 3 may himself observe the incipient flutter and take corrective measures in time.

The present device has been designed for the express purpose that it may be installed to determine such instantaneous deflections and to give an indication thereof, although its use, in the broader sense, and as has already been indicated, is not limited thereto. Still, it is peculiarly well adapted to such uses.

Some of the angular changes in position mentioned above may be considered as relatively small. Other angular changes which it may be necessary to measure may be quite large—20° to as much as possible 180°—representing such deflections as the maximum swing of a control surface, for example. The angular position transducer of this invention is fully capable of measuring such large deflections, as well as the smaller ones.

In the broader sense, the present invention provides an angular deflection gauge by which even minute deflections between any two relatively hingedly connected elements, or more broadly, any deflection within a wide range, may be sensed substantially instantaneously and a signal given, which can be manifested in movement of an indicator to indicate the extent of the deflection or in corrective movement as of a flight stabilizer, or by making a record or graph of such deflections.

In the service primarily indicated, namely, the determination of deflectional movements of an airplane's control surface, such a deflection indicator will be subject to extreme variations of temperature, and it is a subsidiary object of the present invention to provide means, consisting essentially of a particular relative orientation of parts, for compensating automatically for such thermal changes, to the end that the deflector will always read correctly and needs no adjustment from time to time to keep its indication correct.

The present invention consists primarily of a blade, long and thin so that it can be torsionally flexed through a wide range, one end of which, through a readily applied mounting, is arranged to be fixed to a fixed support such as the aircraft structure whereon a control surface is hingedly mounted, and the other end of which is arranged to be angularly deflected by the hinging movement of the control surface. The device is preferably so constructed, and is so mounted, that the longitudinal axis of the blade which is thus angularly deflected upon deflection of the control surface, is aligned with the hinge axis of the control surface. Four strain gauges are affixed to the blade, in a peculiar orientation and relationship to each other and to the axis of the blade, as will be explained in detail hereinafter. These four strain gauges constitute or are part of the four legs of a balanced bridge circuit, whereby unbalance caused by differential strains will produce a signal impulse, and whereby a galvanometer or similar indicator will be caused to deflect in an amount and sense which represents the angular deflection of the blade and the sense thereof. By reason of the mounting of the blade and the orientation and relationship of the strain gauges the deflection of the indicator needle represents the extent of angular deflection of the control surface about its hinge axis. Thermal compensators, of a kind explained more fully hereinafter, are capable of incorporation in the balanced bridge circuit in a manner and for the purposes that will be made clear hereinafter.

In the broad sense the invention comprises the novel angularly deflectable blade and the orientation of four strain gauges thereon with relation to one another, to the longitudinal axis of the blade, and usually also to the blade's midpoint, to the end that upon angular deflection, only, of the blade a signal is produced in the balanced bridge circuit that corresponds in sense and value, with high resolution, to the degree of angular deflection of the blade. In a more limited sense the invention comprises the novel angular deflection gauge and the novel combination of such a gauge in a particular form and manner with the airplane, and in particular, with the control surface and the structure that supports and hingedly mounts the same.

In the accompanying drawings the invention is shown in a typical form and in a typical installation, and its principles and the details of construction whereby these are carried out will be understood from this specification, and those features which are novel will be particularly pointed out in the appended claims.

Figure 1 is a side elevational view largely in phantom, showing a vertical tail surface and a rudder hingedly mounted thereon, and showing the transducer of the present invention operatively mounted in relation thereto, and Figure 2 is a similar isometric view to a larger scale, showing details of the mounting and interconnection.

Figure 3 is an isometric view, partly broken away and shown in section to show the interior construction of the transducer and the relationship of the four strain gauges, one to another.

Figure 4 is a simplified electrical diagram illustrating the principle involved in the manner of connecting the strain gauges in circuit with the indicating galvanometer or similar instrument.

Figure 5 is a diagram relating the orientation of the strain gauges upon the blade to the directional characteristics of torsional force applied to such blade.

Figure 6 is a diagrammatic isometric illustration of the angularly deflectable blade transducer as it might be used in a servo device to control movement of a large, massive body, such as a ship's rudder.

Figure 7 is a diagram similar to Figure 6, showing the transducer incorporated as part of an airplane's automatic pilot.

Figure 8 is a view similar to Figure 5, showing an alternative arrangement of the strain gauges upon the blade.

Figure 9 illustrates diagrammatically still another possible arrangement of the strain gauges upon the blade.

Referring to Figure 3, the transducer which is the instrumentality by which physical angles are translated into electrical signals, includes primarily an elongated blade 1 of thin resiliently deformable material. In a device of this sort which has been produced and used, the blade 1 is of steel, 2½″ long by ½″ wide, and 0.010″ thick, and its edges are parallel. One end of the blade is held securely and fixedly, as by the clamping means indicated at 10, and its opposite end is left free to rotate or oscillate (within the blade's resilient limits of movement). Thus, a spindle 11 may be fixed to its opposite end, and this spindle is capable of being oscillated by a suitable mechanical attachment. This blade is housed within a cylindrical housing 2, the clamping means at 10 being secured to a plug 20 fixed within one end of the cylindrical housing 2, as by the retaining screw 21, and the cylinder is arranged at its opposite end for mounting upon a suitable support, as, for example, by means of the threads at 22 and the lock nut 23. The whole is suitably sealed against entrance of dust and moisture at all points. The overall length of the transducer in the particular form described is slightly more than four inches, and its outside diameter is only three-fourths of an inch, so that it is capable of being installed in a small space, and is of light weight.

Bonded or otherwise affixed to the faces of the blade 1 are four strain gauges. In order to distinguish them, these will be designated by the Roman numerals I, II, III and IV. All are alike, however, and by preference are alike in their current carrying capabilities and characteristics. Gauges I and II are affixed to the same face of the blade, preferably equidistantly disposed at opposite sides of the longitudinal midpoint of the blade, and oriented with their wires at 90° to one another, but both at 45° to and distributed equally at opposite sides of the longitudinal axis of the blade. Gauges III and IV are fixed to the opposite face of the blade, but are similarly arranged and oriented. According to one arrangement, shown in Figures 3 and 5, gauge III is located immediately beneath gauge I and its wires parallel the wires in gauge I, and in like fashion, gauge IV is located immediately beneath gauge II and its wires parallel the wires of gauge II. According to another arrangement, equally effective, and shown in Figure 8, gauges I and II are still affixed to opposite ends of the same face of the blade, and gauges III and IV similarly disposed upon the opposite face, but gauge IV underlies gauge I, with their wires crossing at 90°, and gauge III underlies gauge II, with their wires similarly crossed. The circuitry, explained below, is identical in either case. The important thing is not the registration of the gauges and the parallelism of their wires at opposite faces and at the same end, one with the other, for this is immaterial, but rather the affixation of gauges I and II to the same face of the blade and at opposite ends, and gauges III and IV to the opposite face and likewise at opposite ends, together with the 90° orientation of the gauges' wires relative to one another, and the 45° orientation of all gauge wires to the longitudinal axis of the blade.

Actually, and except for certain advantages arising from the relative 90° orientation of gauges I and II, and of gauges III and IV, many of the objectives of this invention may be achieved without the 90° orientation just referred to. Figure 9 shows the gauges at the same face of the blade oriented at like angles E and F which total less than 90°, and which are different from the angles C and D of the gauges at the opposite face of the blade. Nevertheless, the gauge of Figure 9 will function as well in almost all respects as will the gauges of the other figures. The differences between them will be discussed more fully hereinafter.

Figure 5 attempts to show all the first-described arrangement by offsetting the gauges from their respective locations on the blade. Lead wires, generally indicated at W, lead from the several strain gauges to an exterior point.

The electrical diagram of Figure 4 is simplified and idealized, but illustrates the principle of operation, as applied to the first-described arrangement above. Gauges I and III, which are at the same end but at opposite sides of the blade, constitute two paired legs of a four-leg balanced bridge or Wheatstone circuit, and gauges II and IV, which are at opposite sides of the blade but at the same end thereof, constitute or are incorporated in the two other legs. The whole is arranged so that the equal gauges will, under normal conditions, electrically balance one another, and the sum of the electrical forces applied to an indicating or recording instrument, typified by the galvanometer 3, will normally cause the instrument to register zero under no-stress conditions, when current is applied to the bridge from a current source 39 in the usual manner. If, however, the spindle 11 is deflected angularly, the blade 1 will be deflected correspondingly. If the deflection is counterclockwise, as represented by the arrow A in Figure 5, the gauge I will be extended and the gauge II will be shortened, or contracted, as represented by the full line force representations. At the same time the gauge III will be extended and the gauge IV will be shortened. This will upset the balance in the bridge circuit, and will cause a corresponding deflection of the galvanometer needle at 3, this needle deflection being a linear function of the angular extent of angular deflection of the blade 1, hence of the control surface to which the blade is connected. If, again, the spindle 11 be rotated clockwise as indicated by the arrow B in Figure 5, the gauge I will be shortened, the gauge will be extended, the gauge III will be extended and the gauge IV will be shortened, as represented by the dash-line force representations. Again, the balance of the bridge circuit will be upset but this time in the opposite sense, and this, too, will be indicated by an opposite deflection of the needle of the galvanometer 3.

If, instead of the arrangement and orientation of Figure 5, those of Figure 8 are employed, the action is identical to that just described. The relationship of gauges I and II to each other and to the blade is unchanged, but gauges III and IV are reversed end for end of the blade. Their orientation with relationship to each other and to the blade is still unchanged, and so, since unbalance is the condition to be sensed, it will still be as well sensed by angular deflection of the blade which has the gauges arranged as in Figure 8, as by deflection of the blade and gauges of Figure 5. If the sense of unbalance differs, as between the signals given by the Figure 5 form and by the Figure 8 form, this can be taken into account in the calibration of the indicator 3.

In use, the threaded end 22 of the housing 2 is fixedly secured to an adaptor 41 which, in turn, is fixedly secured to a hinge mount M which is part of the fixed structure S of the airplane. The rudder R includes a hinge lug H supported hingedly in the mounting M in such manner that the hinge axis is in alignment with the longitudinal axis of the housing 2 and of the blade 1 supported therein. To the spindle 11 is fixed a lever L which, in turn, is engaged by a pin P on the rudder outwardly of the hinge axis, and this effects movement of the lever L and, consequently, of the spindle 11 and this free end of the blade, by an amount corresponding to the deflection of the rudder. Through the bridge circuit, already described, this deflection, whatever its amount, large or small, is faithfully and instantaneously represented in deflection of the galvanometer needle at 3. On the other hand, in place of the galvanometer or like indicating instrument it is possible to employ a recording instrument, so that a running graph of the deflection may be kept.

Due to the symmetry of the sensing element of this transducer, temperature errors are very small notwithstanding the wide range of temperatures to which the instrument is normally subjected in use. However, some zero drift has been observed, which is easily compensated by the addition of a small piece of wire, of high temperature coefficient of resistance, to one leg of the bridge. Such a zero drift compensator is indicated in Figure 4 at 4. For compensating the transducer of the type and size described above as typical, Balco wire No. 26 was used, and the length required to compensate for changes in temperature from plus 70° F. to minus 70° F. rarely exceeded one-half inch. In addition, some span error or sensitivity change, the cause whereof might be due to any of various reasons, was observed in transducers using blades as long as six inches. This error was easily compensated by inserting a length of the same Balco wire in either of the leads carrying current to the transducer from the source 39. Such a span change compensation resistor is indicated at 5 in Figure 4, and may be omitted if the conditions do not require it, such, for instance, as using a blade of relatively short length.

Inherent in the design of this transducer are features which balance out errors that might otherwise contribute to erroneous output readings. Any small axial loads, in tension or in compression, which might inadvertently occur will strain all the gauges I to IV equally and, therefore, the sum of the contribution of these strains to bridge unbalance will be zero. If the transducer blade 1 should vibrate in a single loop transversely to its thickness, the two adjacent legs of the bridge will be strained equally in tension while the other two will be strained equally in compression. This again contributes nothing to the bridge output.

The inherent self-neutralizing factors pointed out above arise primarily because the gauge wires of gauges I and II have equal angles with respect to the center line of the blade and are located equidistant from the midpoint of the blade, while at the same time the gauge wires of gauges III and IV have equal angles relative to the blade's center line and they are also located equidistant from the blade's midpoint. The principles of self-neutralization and of automatic temperature compensation do not require the orientation of the gauge wires at the 45° angle to the blade's center line. Only if maximum electrical output is desired is such 45° orientation required. Using angles other than 45° for one or both pairs of gauge wires the transducer will still indicate angular deflection with a high degree of resolution. In Figure 9, for example, gauges I and II at the one face of the blade still remain at angles C and D of 45° each to the blade's longitudinal axis, but gauges III and IV at the blade's opposite face are at angles E and F which are greater than 45° to the blade's axis. So long as gauges III and IV are at like angles E and F, and gauges I and II at like angles C and D, it is immaterial that angle C≠angle E, or whether gauges III and IV be reversed end for end relative to gauges I and II.

As has been noted above, the instrument 3 is to be taken as typical of one that senses and responds to unbalance in the circuitry. It can, therefore, serve as the source of an automatically corrective signal, as in a servo system illustrated diagrammatically in Figure 6. Here the massive element 6 represents a body which, by its inertia or by reason of external resisting forces, is difficult or slow to move. A reversible motor 60 when properly energized rotates it in one or the other sense. The transducer housing 2 is connected to rotate with the element 6, and the spindle 11 has a handwheel 19 affixed to it.

Any angular deflection of the transducer blade caused by rotation of the handwheel 19 produces unbalance in the bridge circuit, and hence a signal which is transmitted to the servo amplifier 61, and thence to the motor 60, to effect rotation of the latter and of the body 6 in the sense to lessen the deflection and to restore the balance. When the balance is restored, rotation ceases.

Similar principles may be employed in the flight stabilizer arrangement of Figure 7. Here the outputs of transducers at 28 and 29 are combined (subtracted), and any difference that exists, originating either at the rate of turn gyro 7 or at the rudder R, goes to the amplifier 62 as an error signal. This signal is amplified and causes the motor 63 to move the rudder R to a new position such that no error, or difference in signal from the combined transducers 28, 29, exists. At such time the motor stops, the rudder is held stationary, and the airplane is prevented from continuing on a course that might lead, for instance, to a nose-down spiral, such as causes most accidents, especially in small aircraft not equipped with an automatic pilot.

It might be supposed that the fact that the transducer's torque is a function of its angular position, would be a disadvantage. At the rate of turn gyro, however, this peculiarity could be used to advantage, because the rate of turn gyro is normally built with a spring in it to do exactly this. The transducer, therefore, would not only be used as a pick-up, but could also replace this spring, thereby performing a dual function in this particular arrangement.

I claim as my invention:

1. In an airplane, in combination with fixed structure and with a control surface hingedly mounted thereon and deflectable angularly throughout a wide angular range with relation thereto, means to measure such deflection comprising a resiliently deflectable blade of a size, shape, and thinness to be deflected angularly between its ends throughout the range of deflection of the control surface, means to fix one end of said blade relative to the fixed structure, means operatively connecting the opposite end of said blade to the control surface for conjoint angular deflection of the blade about its longitudinal axis, four like strain gauges I, II, III and IV affixed to said blade, gauges I and II as a first group affixed to and spaced longitudinally of one face with their wires relatively oriented at like but opposite angles to the blade's longitudinal axis, and gauges III and IV as a second group affixed to and spaced longitudinally of the opposite face, also relatively oriented at angles to the blade's longitudinal axis which are like but opposite, a balanced bridge circuit wherein the four strain gauges are included in the respective four legs, with two gauges, one from each group balanced against the other two gauges when the blade is angularly undeflected, and an indicator operatively connected in said bridge circuit to give a null indication with the gauges thus balanced, and to indicate unbalance therein due to angular deflection of the blade and of the connected control surface, and consequent change in the characteristics of the respective groups of gauges, and the extent of such unbalance as a measure of the amount of angular deflection of the control surface.

2. In an airplane, in combination with fixed structure and with a control surface hingedly mounted thereon and deflectable angularly throughout a wide angular range with relation thereto, means to measure such deflection comprising a resiliently deflectable elongated blade of a size, shape, and thinness to be deflected angularly between its ends through the range of deflection of the control surface, means to fix one end of said blade relative to the fixed structure, means operatively connecting the opposite end of said blade to the control surface for conjoint angular deflection of the blade about its longitudinal axis, four like strain gauges I, II, III and IV affixed to said blade, gauges I and II substantially equidistant and at opposite sides of the midpoint in the blade's length, both on the same face with their wires relatively oriented at like but opposite angles to the blade's longitudinal axis, and gauges III and IV similarly located, positioned, and relatively oriented on the opposite face, with the wires of gauge III paralleling the wires of gauge I, and the wires of gauge IV paralleling the wires of gauge III, a balanced bridge circuit wherein gauges I and III constitute two legs and are normally balanced against gauges II and IV constituting the other two legs, and an electric indicator operatively connected in said bridge circuit, from the connection between gauges I and II to the connection between gauges III and IV, to indicate unbalance in the circuit due to angular deflection of the blade and of the connected control surface, as reflected in elongation of gauges I and IV and in contraction of gauges II and III, or vice versa, and the extent of such unbalance as a measure of the angular deflection of the control surface.

3. The combination of claim 2, including a housing enclosing the blade and the strain gauges, the fixed end of the blade being secured to said housing, and a spindle fixed to the opposite end of the blade and projecting from and sealed with respect to an end of the housing, means to secure the opposite end of the housing to the fixed structure of the airplane, with the blade's longitudinal axis substantially coaxial with the control surface's hinge axis, a lever secured upon said spindle, and an operative connection between said lever and the control surface, located radially outwardly from such common axis.

4. The combination of claim 2, including a length of wire of a high temperature coefficient interposed in one leg of the balanced bridge circuit, to compensate for zero drift in the indicator resulting from unequal elongation or contraction of the strain gauges due to any of a variety of causes such, for example, as temperature change.

5. The combination of claim 2, including a length of wire of a high temperature coefficient interposed in an input lead to the bridge circuit, to compensate for change in the indicator's reading due to changes in the relative sensitivity of the gauges from a cause unrelated to angular deflection, such, for example, as temperature change.

6. The combination of claim 5, including a length of wire of a high temperature coefficient interposed in one leg of the balanced bridge circuit, to compensate for zero drift in the indicator due to any of a variety of causes, such for example as unequal elongation or contraction of the strain gauges.

7. An angular deflection indicator comprising a thin, elongated blade, means to deflect one end of the blade angularly relative to its other end about its longitudinal axis; four strain gauges I, II, III and IV of which gauges I and II constitute a first group at one side of that axis, and are fixed to and spaced apart lengthwise of the same face of the blade, relatively oriented at like but opposite angles to the blade's longitudinal axis, and gauges III and IV constitute a second group at the opposite side of that axis and are fixed to and spaced apart lengthwise of the opposite face of the blade, also relatively oriented at angles to the blade's longitudinal axis which are like but opposite, a circuit wherein said two groups are included, and with one gauge of one group and one gauge of the other group balanced in the respective legs of a four-leg balanced bridge against the other two gauges when the blade is angularly undeflected about its longitudinal axis, and an electrical indicator in said circuit to signify the fact and extent of unbalance arising from angular deflection of the blade.

8. An angular deflection indicator as in claim 7, wherein the gauges I and II of the first group are disposed equidistantly and at opposite ends of the blade from the blade's longitudinal midpoint, and the gauges III and IV of the second group are similarly disposed relative to one another and to the blade's midpoint.

9. An angular deflection indicator as in claim 8, wherein the mean distance of gauges III and IV of the first group from the blade's midpoint is equal to the mean distance therefrom of gauges I and II of the second group.

10. An angular deflection indicator as in claim 7, wherein the two gauges of a group at one face of the blade are oriented at angles of 45° to the blade's longitudinal axis, and at 90° to each other, and the two gauges of a group at the other face of the blade are oriented at angles other than 45° to the blade's longitudinal axis, and at equal angles to that axis.

11. An angular deflection indicator as in claim 7, wherein all the gauges are oriented at angles of 45° to the blade's longitudinal axis, each two of the respective groups at like faces of the blade being oriented at 90° to one another.

12. An angular deflection indicator as in claim 7, wherein the gauges I and II are disposed equidistantly and at opposite ends of the blade from the blade's longitudinal midpoint, and the gauges III and IV are similarly disposed relative to one another and to the midpoint, the gauges I and III being both at the same end of the blade, oriented generally in the same direction, and the gauges II and IV being both at the blade's opposite end, oriented also generally in the same direction.

13. An angular deflection indicator as in claim 7, wherein the gauges I and II are disposed equidistantly and at opposite ends of the blade from the blade's longitudinal midpoint, and the gauges III and IV are similarly disposed relative to one another and to the midpoint, the gauges I and IV being both at the same end of the blade, oriented relatively crosswise, and the gauges II and III being both at the blade's opposite end, oriented also relatively crosswise.

14. An angular deflection indicator comprising a flat, elongated blade, means to deflect the respective ends of the blade angularly about it longitudinal axis, one end relative to the other, and throughout a wide angular range; four strain gauges I, II, III and IV, of which gauges I and II are fixed to the same face of the blade and gauges III and IV are fixed to the opposite face of the blade, with gauges I and II, and III and IV, respectively equidistant from and at opposite sides of the blade's longitudinal midpoint, with gauges I and II oriented with their wires extending at 90° to one another, and both at 45° to the longitudinal axis of the blade, and with gauges III and IV similarly oriented relative to one another and to the blade, gauge III being at the same side of the midpoint as gauge I and oriented with its wires parallel to the wires of gauge I, and gauge IV being at the same side of the midpoint as gauge II and oriented with its wires parallel to the wires of gauge II, a circuit wherein said four gauges are included and balanced in the respective legs of a four-leg balanced bridge, and an electrical indicator in said circuit to indicate the fact and extent of unbalance arising from torsional deflection of the blade.

15. An indicator as in claim 14, including a length of conductor of a high temperature coefficient interposed in one leg of the balanced bridge circuit, to compensate for zero drift in the indicator due to any of a variety of causes, such for example as relative unequal elongation or contraction of the strain gauges and the blade.

16. An indicator as in claim 14, including a length of conductor of a high temperature coefficient interposed in an input lead to the bridge circuit, to compensate for change in the indicator due to any of a variety of unequal causes, such for example as an unequal change in relative sensitivity of the gauges or contraction of the blade of the blade and the strain gauges.

17. The combination of claim 16, including a length of conductor of a high temperature coefficient interposed in one leg of the balanced bridge circuit, to compensate for zero drift in the indicator due to any of a variety of causes, such for example as unequal elongation or contraction of the strain gauges and the blade.

References Cited in the file of this patent

UNITED STATES PATENTS

| | | |
|---|---|---|
| 2,183,078 | Kemler | Dec. 12, 1939 |
| 2,392,293 | Ruge | Jan. 1, 1946 |
| 2,403,951 | Ruge | July 16, 1946 |
| 2,428,012 | Collins | Sept. 30, 1947 |
| 2,439,146 | Ruge | Apr. 6, 1948 |
| 2,531,228 | MacGeorge | Nov. 21, 1950 |
| 2,535,667 | Burger | Dec. 26, 1950 |
| 2,620,391 | King | Dec. 2, 1952 |
| 2,719,263 | Flowers et al. | Sept. 27, 1955 |

UNITED STATES PATENT OFFICE

CERTIFICATE OF CORRECTION

Patent No. 2,909,764                                   October 20, 1959

Guy R. Chambers

It is hereby certified that error appears in the printed specification of the above numbered patent requiring correction and that the said Letters Patent should read as corrected below.

Column 7, line 39, for "gauge III" read -- gauge II --; column 8, line 16, after "axis" insert a comma; column 10, lines 1 and 2, strike out "unequal" and insert the same before "contraction" in line 3; line 4, strike out "of the blade".

Signed and sealed this 19th day of April 1960.

(SEAL)
Attest:

KARL H. AXLINE
Attesting Officer

ROBERT C. WATSON
Commissioner of Patents